J. J. SLEEPER.
COOKER.
APPLICATION FILED JUNE 10, 1913.
1,137,359.
Patented Apr. 27, 1915.
2 SHEETS—SHEET 1.
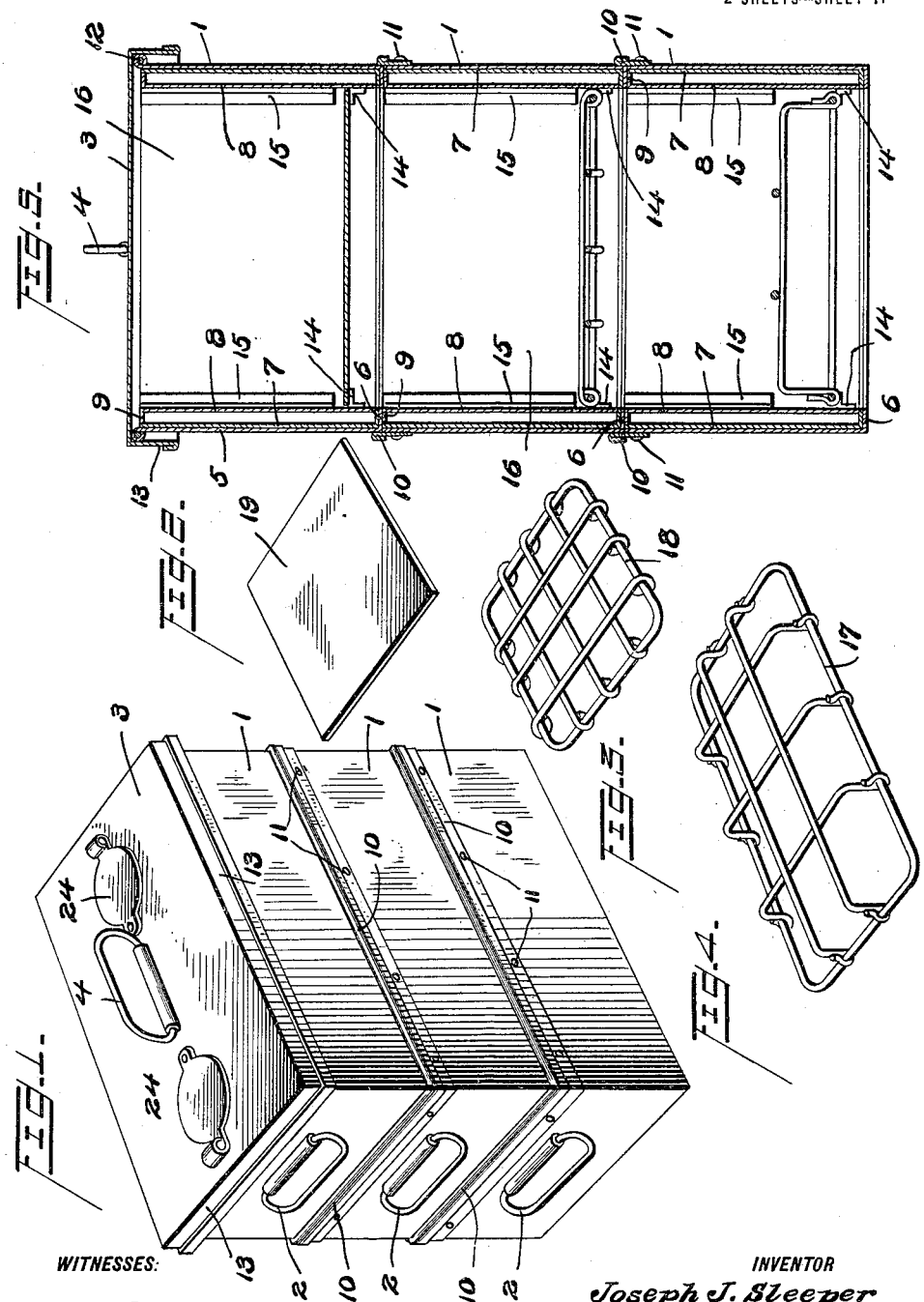
WITNESSES:
INVENTOR
Joseph J. Sleeper
BY
Joshua R. H. Potts
ATTORNEY J. J. SLEEPER.
COOKER.
APPLICATION FILED JUNE 10, 1913.
1,137,359.
Patented Apr. 27, 1915.
2 SHEETS—SHEET 2.
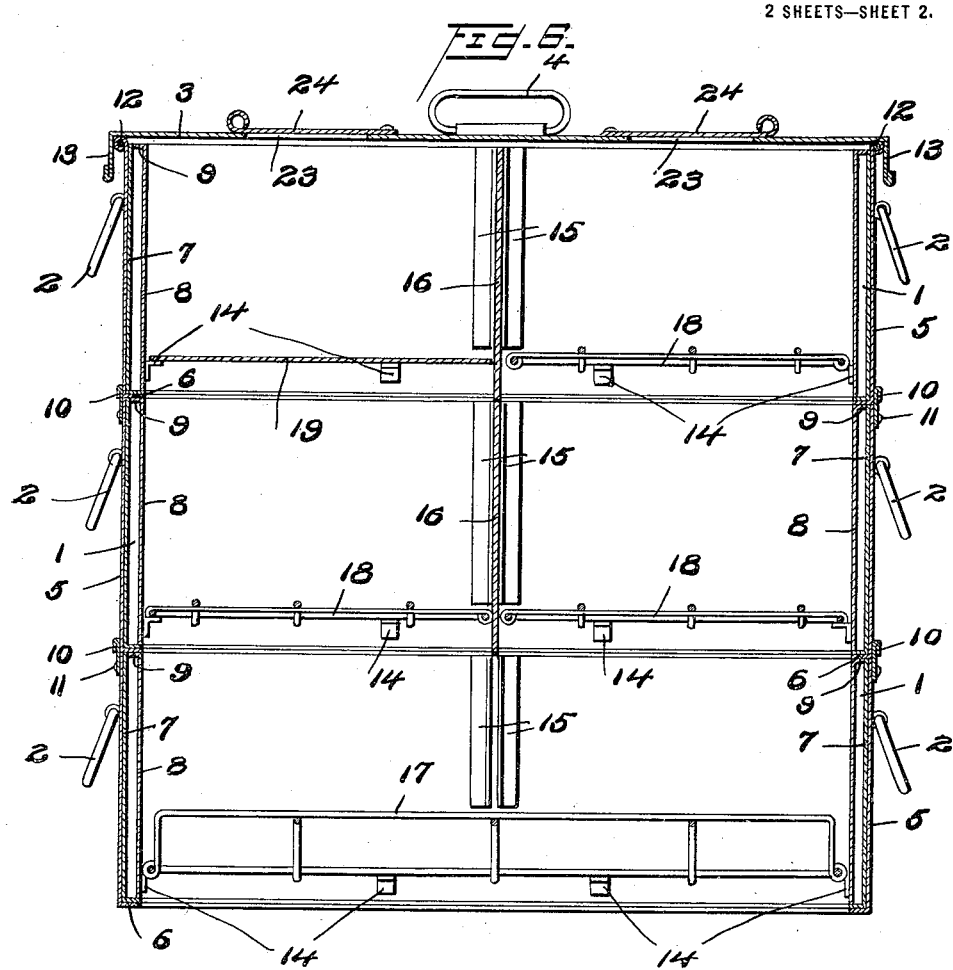
WITNESSES:
H. Strauss
C. R. Ziegler.
INVENTOR
Joseph J. Sleeper
BY
Joshua R. H. Potts.
ATTORNEY

UNITED STATES PATENT OFFICE.

JOSEPH J. SLEEPER, OF MOORES, PENNSYLVANIA.

COOKER.

1,137,359.  Specification of Letters Patent.  Patented Apr. 27, 1915.

Application filed June 10, 1913. Serial No. 772,754.

*To all whom it may concern:*

Be it known that I, JOSEPH J. SLEEPER, a citizen of the United States, residing at Moores, in the county of Delaware and State of Pennsylvania, have invented certain new and useful Improvements in Cookers, of which the following is a specification.

My invention relates to improvements in cookers, and more particularly to an improved device adapted to be positioned over a burner, and which will economize fuel and utilize to the maximum degree the heat units for cooking.

A further object is to provide in a cooker which comprises a plurality of superimposed similar sections, an improved construction of the section or unit which insures an air space all around the same, and which is capable of a wide range of variation in its use.

With these and other objects in view, the invention consists in certain novel features of construction and combinations and arrangements of parts as will be more fully hereinafter dscribed and pointed out in the claims.

In the accompanying drawings: Figure 1 is a perspective view illustrating my improved cooker showing three sections. Figs. 2, 3, and 4 are detail perspective views of different forms of tray. Fig. 5 is a view in transverse section through the cooker, said section being on an enlarged scale. Fig. 6 is a view in longitudinal section through the center of the cooker shown in Fig. 5, and Fig. 7 is a perspective view of a modified form of tray.

My improved cooker comprises a plurality of superimposed sections 1, each section provided at its ends with handles 2, and a cover 3 is positioned over the upper section and is provided with a handle 4. All of the sections are precisely alike, and hence a description of one will apply alike to all. Each section 1 is composed preferably of sheet metal and comprises an outer shell 5 having an inwardly projecting flange 6 at its lower edge throughout its sides and ends. A removable casing 8 fits within the shell and is provided at its upper edge throughout its sides and ends with an outwardly projecting flange 9, which engages the walls of the outer shell so that an air space is provided all around each cooker section. If preferred the wall of the shell 5 may include a lining of sheet asbestos or other suitable non-conducting material. This air space may be filled more or less with packing material if desired, but in any event, it will contain an amount of dead air which once becoming heated, maintains a relatively high temperature for a considerable length of time.

It is my intention to maintain the inner casing 8 within the shell by friction only, so that if it is desired to rapidly cool the section, it is simply necessary to lift the inner casing slightly and allow the hot air in the air space to escape and be replaced by cooler air.

The two lower sections are provided at their upper edges with upwardly projecting strips 10 secured by rivets 11 to the outer shells 5 and constituting a flange within which the section above snugly fits so as to prevent possibility of lateral movement of one section upon the other. The top section is preferably provided with a reinforced rounded bead 12 at its upper edge over which the depending flange 13 of cover 9 snugly fits. Each section 1 is provided adjacent its lower edge with angle brackets 14, and each section is provided at opposite sides with parallel angle bars 15 constituting guides for the reception of vertical partitions 16 to divide the sections longitudinally.

Figs. 2, 3, 4, and 7 illustrate various styles of trays which may be supported upon the angle brackets 14. Preferably a tray 17, such as shown in Fig. 4, is supported upon the angle brackets 14 of the lowest section 1. This tray is of wire, and is preferably of a length to extend throughout the length of the cooker, and may be located as shown in Fig. 6 or reversed so that the cooking utensils (not shown) may be spaced the desired distance from the burner.

As shown in Fig. 6, the upper sections 1 are divided by the vertical partitions 16, so that cooking chambers are formed at opposite sides of these partitions. In three of these chambers, trays 18, one of which is shown in perspective in Fig. 3, are illustrated. These trays 18 are also of wire and are supported upon the angle brackets 14.

The bottom of the upper left hand chamber, as shown in Fig. 6, is closed by a solid tray 19 as shown in Fig. 2, so that this chamber is to a considerable extent shut off from the other chambers and receives but a relatively small amount of heat which is sufficient, however, to keep warm the food that has been cooked.

In Fig. 7, a modified form of tray is illustrated in which a metal sheet 20 is provided with longitudinal slots 21, and the metal cut from said slots bent upwardly forming supporting flanges 22. By using a tray of this form within the cooker, the heat rising from the burner or from one of the lower sections is concentrated beneath the bottom of the vessel resting on the flanges 22 instead of allowing the heat to pass up around the sides of the vessel and not be utilized. The top 3 is provided with opening 23 normally closed by pivoted dampers 24, so that by swinging these dampers, the outlet of heat can be controlled in the various compartments and any desired temperature may be had.

While I have illustrated my improvements in connection with a cooker having sections of general rectangular shape, I would have it understood that the invention is not limited to any particular shape, nor do I limit myself to the precise arrangement of trays and partitions as indicated, but consider myself at liberty to make such changes and alterations as fairly fall within the spirit and scope of the appended claims.

Having thus described my invention, what I claim as new and desire to secure by Letters Patent is:

1. A cooker consisting of two separable members, one member comprising an outer shell, and the other member an inner removable casing appreciably smaller than the shell, said shell having at its lower end an inwardly projecting flange supporting the casing, and said casing at its upper end having an outwardly projecting flange frictionally engaging the inner surface of the shell, said shell and casing when together forming a dead air chamber all around the casing, the air within said last-mentioned chamber adapted to be released when the casing is moved relative to the shell, substantially as described.

2. A cooker section consisting of an outer shell having an inwardly projecting flange at its lower edge, and a removable inner casing having an outwardly projecting flange at its upper edge frictionally engaging the inner face of the walls of the shell, said shell and casing when together forming a dead air chamber all around the casing, the air within said last-mentioned chamber adapted to be released when the casing is moved relative to the shell, said outer shell having on its inner surface a covering of non-conducting material, substantially as described.

In testimony whereof I have signed my name to this specification in the presence of two subscribing witnesses.

JOSEPH J. SLEEPER.

Witnesses:
M. E. DITTUS,
CHAS. E. POTTS.

Copies of this patent may be obtained for five cents each, by addressing the "Commissioner of Patents, Washington, D. C."